Patented Dec. 25, 1945

2,391,465

UNITED STATES PATENT OFFICE 2,391,465

SYNTHESIS OF VINYL CHLORIDE

Wilbur A. Lazier, Wilmington, and Gerald M. Whitman, Claymont, Del., assignors to E. I. du Pont de Nemours & Company, Wilmington, Del., a corporation of Delaware No Drawing. Application October 21, 1942, Serial No. 462,834

8 Claims. (Cl. 260—656)

This invention relates to the field of hydrohalogenation reactions, and more particularly to new catalysts for the synthesis of vinyl chloride by addition of hydrogen chloride to acetylene.

One of the most acceptable methods for the manufacture of vinyl chloride is the catalytic addition of hydrogen chloride to acetylene. The most efficient catalyst found for this reaction is mercuric chloride. The general theory of the mechanism of this synthesis is that the reaction is facilitated by the formation of a complex, such as $HHgCl_3$ or $H_2HgCl_4$. Hence the reaction calls for a catalyst which is reactive towards hydrogen chloride. Likewise the ability of mercuric salts to catalyze reactions involving acetylene is considered to depend upon the intermediate formation of mercury derivatives of acetylene. Varshavskii states that there is evidence of such a compound as $ClHg-CH=CH-Cl$ as an intermediate in the vinyl chloride synthesis Compt. Rend. Acad. Sci. U. R. S. S. 29, 315 (1940); C. A. 35, 3225 (1941). The excellence of mercuric chloride as a catalyst for vinyl chloride synthesis appears therefore to be based upon the unusual facility with which it forms complexes with hydrogen chloride and acetylene. However, in commercial practice mercuric chloride catalysts have a relatively short life. Since this short life was considered to be principally due to the tendency of mercuric chloride to volatilize, as evidenced by the fact that the life may be increased with decrease in the temperature of reaction, attempts have been made to modify the mercuric chloride with alkali metal halides or alkaline earth metal halides so as to decrease its volatility (U. S. Patents No. 2,225,635 and 2,265,286). At temperatures low enough to increase the life of the mercuric chloride catalyst, the output of vinyl chloride is so low as to be unsatisfactory. A further disadvantage of mercuric chloride is its high toxicity and the consequent exposure hazard.

Because of the short life of mercuric chloride catalyst, attempts have been made to find other types of catalyst. Among those suggested in the prior art are the chlorides of magnesium, zinc, calcium, barium, strontium, cadmium, aluminum, iron, vanadium, arsenic, antimony, bismuth, tin and copper. All of these catalysts, however, have proven inferior to mercuric chloride in some important respects, such as activity, life or specificity of action (e. g., they give tetrachlorethylidene chloride rather than vinyl chloride).

This invention has as an object an important improvement in the manufacture of vinyl chloride. A further object is a new and improved catalyst for effecting the addition of hydrogen chloride to acetylene. Another object is a catalyst for vinyl chloride synthesis which has an improved life in continuous operation. Still another object is a more active catalyst for vinyl chloride synthesis. Another object is a non-toxic catalyst for vinyl chloride synthesis. Other objects will be apparent from the following description of the invention.

According to the present invention vinyl chloride is synthesized by passing a mixture of acetylene and hydrogen chloride over a catalyst consisting essentially of mercurous chloride.

In the preferred practice of this invention the reaction is carried out in the vapor phase using the mercurous chloride catalyst in a thoroughly dispersed or comminuted form in combination with a porous carrier material such as charcoal.

In order to obtain the most satisfactory results when preparing the catalyst, it is necessary to resort to artifices especially adapted to cope with the well-known fact of the high degree of water insolubility of mercurous chloride. In the preparation of a supported mercuric chloride of the prior art it is sufficient merely to soak the carrier substance in a solution of the catalyst salt. Such a method cannot be applied to mercurous chloride. One method for the preparation of the mercurous chloride catalyst of the invention is to stir activated charcoal with 7% of its weight of mercuric chloride dissolved in just enough water to thoroughly wet the charcoal, which is then suspended in water. The water is saturated with sulfur dioxide and the suspension stirred for several hours, after which the charcoal is removed from the excess liquid, washed thoroughly with water and dried. This process results in the complete conversion of the water-soluble mercuric chloride to the water-insoluble mercurous chloride. It is not claimed that by this procedure the resulting catalyst is as thoroughly dispersed over the surface of the carrier as in the case of catalysts impregnated from solution, but the mercurous chloride is thoroughly commingled with the carrier and is at least partially supported thereon. The resulting mercurous chloride-on-charcoal catalyst is transferred to a closed reactor which is surrounded by a boiling liquid bath for efficient temperature control. It is preferable to choose as the heat exchange medium a liquid such as tetrachlorethane boiling near 150° C., although satisfactory results are obtained at higher temperatures. After a preliminary purging of the apparatus with nitrogen, a mixture of 100 volumes of acetylene and 115 volumes of hydrogen chloride is passed through the tube containing the catalyst. A moderate rise in temperature due to the heat of reaction occurs near the point of entry of the gas mixture. The gases leaving the reactor are scrubbed with water to remove unreacted hydrogen chloride, dried by passing through calcium chloride towers and refrigerated to condense vinyl chloride. The conversion based on acetylene is essentially quantitative and the vinyl chloride formed is of high purity. If desired the effluent gases from the reactor can be refrigerated immediately to remove most of their vinyl chloride content, and the uncondensed gases can be recycled after admixture of fresh acetylene and hydrogen chloride to give the preferred ratio of reactants.

The following examples show in greater detail how the invention may be carried out in several of its modifications:

Example I

Finely divided mercurous chloride was prepared by reduction of mercuric chloride with dextrose as described in Mellor, "Comprehensive Treatise on Inorganic and Theoretical Chemistry," vol. IV, p. 800, and washed with water until the washings were essentially chloride-free. A suspension of 10 parts of the resulting mercurous chloride in 100 parts of water was stirred with 31 parts of granular charcoal for two hours, the excess liquid drained from the charcoal, and the impregnated charcoal carefully dried. Analysis of a catalyst prepared in this manner showed that it contained 2.9% of mercurous chloride calculated on the dry weight of charcoal.

A single-tube reactor was charged with the mercurous chloride-on-charcoal catalyst and immersed in a liquid bath which was heated to its boiling point of 146° C. After a preliminary purging of the apparatus with nitrogen, a mixture of 100 volumes of acetylene and 118 volumes of hydrogen chloride was passed through the catalyst at a space velocity of approximately 260 volumes of gas per unit volume of catalyst per hour. Within a short time the temperature at the point of first contact of the gas mixture with the catalyst had risen to 208° C. due to the heat of reaction. Analysis of the gases leaving the reactor showed that substantially all of the input acetylene had been converted to vinyl chloride. The effluent gases when not diverted to the analyzer were passed through soda lime to remove the unreacted hydrogen chloride and then passed through cold traps to condense the newly formed vinyl chloride. After more than 20 hours of continuous operation the conversion of input acetylene was still above 99%, and the point of maximum reaction as shown by the temperature gradient within the catalyst bed was still only 1½ inches from the point of entry of the gases.

Under the same conditions of temperature and space velocity, a catalyst consisting of the same charcoal as that used for preparation of the mercurous chloride catalyst but impregnated with 7% of its weight of mercuric chloride converted only 86–88% of the input acetylene to vinyl chloride. Six hours after the start of the run this conversion had already fallen to 83%.

In contrast to the performance of the mercurous chloride-on-charcoal catalyst, massive mercurous chloride when tested under the same conditions of temperature and space velocity gave only 3 to 5% conversion of the input acetylene to vinyl chloride.

Example II

A single tube reactor was charged with mercurous chloride-on-charcoal catalyst prepared as in Example I and immersed in a liquid bath which was heated to its boiling point of 213° C. After a preliminary purging of the apparatus with nitrogen, a mixture of 100 volumes of acetylene and 118 volumes of hydrogen chloride was passed through the catalyst at a space velocity of 230 volumes of gas per unit volume of catalyst per hour. Within a short time the temperature at the point of entrance of the gases into the catalyst bed had risen to 262° C., and this exothermic effect persisted throughout the run. Analysis of the gases leaving the reactor showed that 97–98.5% of the input acetylene had been converted to vinyl chloride. Under the same conditions of temperature and space velocity, a catalyst consisting of the same charcoal impregnated with 7% of its weight of mercuric chloride gave only 91–93% conversion of the acetylene to vinyl chloride.

Example III

A solution of 11.5 parts of mercuric chloride and 0.6 part of 37% hydrochloric acid in 100 parts of water was poured with stirring over 78 parts of granular charcoal. The impregnated charcoal was dried at 110° C. for 24 hours. A solution of 5 parts of sodium bicarbonate and 10 parts of dextrose in 80 parts of water was mixed with a solution of 7.5 parts of magnesium chloride hexahydrate in 20 parts of water, and the mixture was poured over the dried impregnated charcoal with stirring. The resulting charcoal-liquid mixture was dried on a steam bath to complete reduction of the mercuric chloride, and the charcoal was then washed with water until the washings were substantially chloride-free. After the resulting mercurous chloride-on-charcoal catalyst had been dried at 25° C. and 20 mm. pressure of mercury, analysis showed a content of 3.7% mercurous chloride by weight.

In a run made under the same conditions as Example I, this catalyst also effected essentially quantitative conversion of acetylene to vinyl chloride. Examination of the catalyst after the run revealed the absence of mercuric chloride in more than minute amounts and confirmed that mercurous chloride was responsible for the extraordinary activity of the catalyst.

Example IV

Thirty pounds of granular activated carbon was shaken with a solution of 2.3 pounds of mercuric chloride in just sufficient water to thoroughly wet the carbon. The impregnated carbon was partially dried in air, transferred to an acid-resistant vessel and covered with water. Sulfur dioxide was blown into the stirred carbon suspension until the water was saturated. The mixture was allowed to stand for 4 hours, the liquid drained from the impregnated carbon, and the impregnated carbon thoroughly washed with water and dried. The dried catalyst, consisting of carbon impregnated with mercurous chloride, was sufficient to fill a multi-tubular reactor of 1.6 cu. ft. capacity.

A mixture of acetylene and hydrogen chloride in 100 to 115 volume ratio was passed through the multi-tubular converter mentioned above, which was packed with the catalyst as prepared above and immersed in a liquid maintained at 145° C. Reaction began at once, as indicated by the substantial absence of acetylene in the gases from the reactor, and a marked rise in temperature in the catalyst bed. During the course of 280 hours of operation, a total of 15,300 cu. ft. of acetlyene and 17,500 cu. ft. of hydrogen chloride was passed through the reactor. Unconverted acetylene during this period amounted to only 245 cu. ft., giving a conversion of acetylene to vinyl chloride of 98.4%. Analysis of the vinyl chloride produced indicated better than 99% purity throughout the total operation. At the end of the 280-hour period, the conversion of acetylene was still 95.5% of the theoretical, so that the useful life of the catalyst was therefore considerably longer than 280 hours.

The above examples illustrate representative embodiments of the invention. The reaction conditions such as temperature, pressure, space velocity, ratio of reactants and form of apparatus may be varied within wide limits, although the value chosen for any one reaction condition will depend to some extent upon the value of each of the other reaction conditions. The preferred temperature range of operation is 100°–250° C., but higher or lower temperatures may be used if desired. The reaction of acetylene and hydrogen chloride to form vinyl chloride is very exothermic and will proceed even at room temperature. Temperatures higher than 250° C. may likewise be used, although at these higher temperatures the catalyst may have to be replaced more frequently. In practice the specific temperature chosen will depend to some extent upon the construction of the apparatus and its capacity for efficient removal of the large heat of reaction, which in turn is proportional to the space velocity of the reactants. Pressures higher or lower than atmospheric pressure may be used. Higher pressures may be preferred because they allow an increased throughput of reactants per unit volume of catalyst and because they facilitate condensation of the vinyl chloride formed. Any ratio of hydrogen chloride to acetylene can be used, although an excess of acetylene may lead to more rapid catalyst deterioration.

Although massive mercurous chloride will effect small conversion of acetylene and hydrogen chloride to vinyl chloride, it is necessary in order to obtain the most satisfactory results to use the mercurous chloride in a highly dispersed or comminuted form, as for example in combination with a porous carrier substance, in order to expose the maximum surface of catalyst to the reaction. Examples of suitable carrier materials are porous clay, active carbon, silica gel and pumice. Any suitable concentration of mercurous chloride on the carrier may be used, preferably in the range of 1% to 50%. It is most advantageous to use relatively low concentrations, since one outstanding advantage of mercurous chloride over mercuric chloride is its greater activity at low concentrations on the carrier.

The usual method of preparing a metal halide catalyst consists of soaking the support in an aqueous solution of the metal halide. However, because of the high degree of insolubility of mercurous chloride in water and in other inert solvents, it is necessary to use special methods for the preparation of satisfactory catalysts. One such method consists of stirring a suspension of mercurous chloride in water or other liquid medium, removing the excess liquid, if any, and drying the impregnated carrier. To obtain the most satisfactory combination of mercurous chloride with the carrier in this method, it is necessary to prepare the mercurous chloride in a thoroughly dispersed or comminuted condition. One method which has proved satisfactory in this respect is the reduction of mercuric chloride under carefully controlled conditions with reducing agents such as dextrose or sulfur dioxide. Another method of preparing a satisfactory catalyst which appears to result in more even distribution of the mercurous chloride on the carrier substance consists essentially of impregnating the carrier with a solution of mercuric chloride, reducing the mercuric chloride in situ on the carrier to mercurous chloride and washing the impregnated carrier free from any soluble chloride. Examples of suitable reducing agents for this purpose are dextrose, sulfur dioxide, ammonium sulfite and formic acid. Still another satisfactory method of preparing the catalyst consists of forming mercurous chloride in a highly dispersed condition by metathesis on the carrier material, e. g., by impregnating the carrier first with mercurous nitrate and then with a solution of hydrochloric acid or soluble chloride. Another method involves the action of chlorine or hydrogen chloride on the carrier impregnated with mercury.

It has been pointed out that the excellence of mercuric chloride as a catalyst for vinyl chloride synthesis is generally considered to be based upon the unusual facility with which it forms complexes with hydrogen chloride and acetylene. It is therefore very surprising that mercurous chloride is an even better catalyst for vinyl chloride synthesis, in view of the extreme unreactivity of mercurous chloride in comparison with mercuric chloride. It is known, for example, that mercuric chloride readily forms complexes with a very large number of other chemical reagents, including the halogen acids, while mercurous chloride forms almost no double salts or addition compounds. Although there are many references in the prior art to the formation of addition compounds from acetylene and mercuric chloride such as the $ClHgCH=CH-Cl$ reported by Varshavskii, there is no reference to the preparation of such compounds from acetylene and mercurous chloride. It will be noted that the compound reported by Varshavskii contains only bivalent mercury. However, in spite of the relative inactivity of mercurous chloride and its supposed inability to form the necessary complex salts for the catalytic synthesis of vinyl chloride, when in a properly comminuted form and commingled with a porous carrier it has proved to be more active for the synthesis of vinyl chloride than any catalyst heretofore known. This catalyst has the required long life for satisfactory commercial operation, gives yields in excess of the best known mercuric chloride catalysts and is non-toxic. Such a result is highly unexpected in the face of the existing art.

As many apparently widely different embodiments of this invention may be made without departing from the spirit and scope thereof, it is to be understood that this invention is not to be limited to the specific embodiments shown and described.

We claim:

1. The process for the preparation of vinyl chloride, which comprises passing a mixture of acetylene and hydrogen chloride over a preformed catalyst consisting of thoroughly dispersed mercurous chloride commingled with a porous carrier by impregnating said carrier with an aqueous solution of mercuric chloride and then reducing the latter in situ to the mercurous state.

2. The process for the preparation of vinyl chloride, which comprises passing a mixture of acetylene and hydrogen chloride over a preformed catalyst consisting of thoroughly dispersed mercurous chloride supported on and commingled with activated charcoal by impregnating said charcoal with an aqueous solution of mercuric chloride and then reducing the latter in situ to the mercurous state.

3. The process in accordance with claim 2 characterized in that the reaction is carried out in the vapor phase.

4. The process for the preparation of vinyl chloride, which comprises passing a mixture of acetylene and hydrogen chloride in the vapor phase over a preformed catalyst consisting of mercurous chloride supported on activated carbon, said mercurous chloride catalyst being prepared by exposing activated charcoal impregnated with a solution of mercuric chloride to the action of sulfur dioxide while suspending said activated carbon in water.

5. As a catalyst composition for the synthesis of vinyl chloride only thoroughly dispersed mercurous chloride commingled with and at least partially supported on a porous carrier, said catalyst having been prepared by impregnating the porous carrier with an aqueous solution of mercuric chloride and then reducing the latter in situ to the mercurous state.

6. As a catalyst composition for the synthesis of vinyl chloride only thoroughly dispersed mercurous chloride commingled with and at least partially supported on activated charcoal, said catalyst having been prepared by impregnating the porous carrier with an aqueous solution of mercuric chloride and then reducing the latter in situ to the mercurous state.

7. A process for synthesizing vinyl chloride which comprises passing a mixture of acetylene and hydrogen chloride for vapor phase reaction over a preformed catalytic composition which consists of mercurous chloride thoroughly dispersed over the surfaces of a porous carrier, said catalytic composition prior to use having been prepared by impregnating said carrier with a solution of mercuric chloride, and then reducing the latter in situ to the mercurous state.

8. A process for synthesizing vinyl chloride which comprises passing a mixture of acetylene and hydrogen chloride for vapor phase reaction, at a temperature ranging from about 100–250° C., over a preformed catalytic composition which consists of mercurous chloride thoroughly dispersed over the surfaces of activated charcoal as a carrier, said catalyst prior to use having been prepared by impregnating said charcoal with a solution of mercuric chloride, and then reducing said mercuric chloride in situ to the mercurous state.

WILBUR A. LAZIER.
GERALD M. WHITMAN.